United States Patent
Williams et al.

(10) Patent No.: US 6,558,600 B1
(45) Date of Patent: May 6, 2003

(54) METHOD FOR PACKAGING MICROELECTRONIC SUBSTRATES

(75) Inventors: Vernon M. Williams, Meridian, ID (US); Chad A. Cobbley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/565,638

(22) Filed: May 4, 2000

(51) Int. Cl.⁷ .......................... B29C 45/02; B29C 70/70
(52) U.S. Cl. .......................... 264/272.14; 264/272.15; 264/272.17; 264/328.5
(58) Field of Search .......................... 264/272.11, 272.14, 264/272.15, 272.17, 328.4, 328.5; 425/116, 543, 544; 438/106, 126, 127; 257/701, 702, 787, 788; 29/855, 856

(56) References Cited

U.S. PATENT DOCUMENTS

| | | | |
|---|---|---|---|
| 4,473,516 A | * | 9/1984 | Hunerberg .................. 264/45.1 |
| 4,569,814 A | * | 2/1986 | Chong et al. .......... 264/272.14 |
| 4,814,137 A | * | 3/1989 | Beuchel et al. ............. 376/429 |
| 5,043,199 A | * | 8/1991 | Kubota et al. ........... 264/328.5 |
| 5,107,328 A | | 4/1992 | Kinsman |
| 5,128,831 A | | 7/1992 | Fox, III et al. |
| 5,138,434 A | | 8/1992 | Wood et al. |
| 5,431,854 A | * | 7/1995 | Pas .......................... 264/328.5 |
| 5,593,927 A | | 1/1997 | Farnworth et al. |
| 5,677,566 A | | 10/1997 | King et al. |
| 5,696,033 A | | 12/1997 | Kinsman |
| 5,739,585 A | | 4/1998 | Akram et al. |
| D394,844 S | | 6/1998 | Farnworth et al. |
| 5,815,000 A | | 9/1998 | Farnworth et al. |
| D402,638 S | | 12/1998 | Farnworth et al. |
| 5,851,845 A | | 12/1998 | Wood et al. |
| 5,866,953 A | | 2/1999 | Akram et al. |
| 5,888,443 A | * | 3/1999 | Bolanos et al. ........ 264/272.17 |
| 5,891,753 A | | 4/1999 | Akram |
| 5,893,726 A | | 4/1999 | Farnworth et al. |
| 5,898,224 A | | 4/1999 | Akram |
| 5,933,713 A | | 8/1999 | Farnworth |
| 5,938,956 A | | 8/1999 | Hembree et al. |
| 5,946,553 A | | 8/1999 | Wood et al. |
| 5,955,115 A | * | 9/1999 | Bolanos et al. ........ 264/272.17 |
| 5,958,100 A | | 9/1999 | Farnworth et al. |
| 5,986,209 A | | 11/1999 | Tandy |
| 5,989,941 A | | 11/1999 | Wensel |
| 5,990,566 A | | 11/1999 | Farnworth et al. |
| 5,994,784 A | | 11/1999 | Ahmad |
| RE36,469 E | | 12/1999 | Wood et al. |
| 6,008,070 A | | 12/1999 | Farnworth |
| 6,020,629 A | | 2/2000 | Farnworth et al. |
| 6,025,728 A | | 2/2000 | Hembree et al. |

(List continued on next page.)

*Primary Examiner*—Angela Ortiz
(74) *Attorney, Agent, or Firm*—Perkins Coie LLP

(57) ABSTRACT

A method and apparatus for encapsulating a microelectronic substrate. In one embodiment, the apparatus can include a mold having an internal volume with a first portion configured to receive the microelectronic substrate coupled to a second portion configured to receive a pellet for encapsulating the microelectronic substrate. A plunger moves axially in the second portion to force the pellet into the first portion and around the microelectronic substrate. The pellet has overall external dimensions approximately the same as a conventional pellet, but has cavities or other features that reduce the volume of the pellet and the amount of pellet waste material left after the pellet encapsulates the microelectronic substrate. Accordingly, the pellet can be used with existing pellet handling machines. The mold and/or the plunger can have protrusions and/or other shape features that reduce the size of the first portion of the internal volume. In one aspect of this embodiment, the protrusions can be shaped to fit within the cavities of the pellet.

14 Claims, 2 Drawing Sheets

U.S. PATENT DOCUMENTS

| | | |
|---|---|---|
| 6,028,365 A | 2/2000 | Akram et al. |
| 6,046,496 A | 4/2000 | Corisis et al. |
| 6,048,744 A | 4/2000 | Corisis et al. |
| 6,048,755 A | 4/2000 | Jiang et al. |
| 6,049,125 A | 4/2000 | Brooks et al. |
| 6,066,514 A | 5/2000 | King et al. |
| 6,071,457 A * | 6/2000 | Bednarz et al. ........ 264/272.17 |
| 6,072,236 A | 6/2000 | Akram et al. |
| 6,075,288 A | 6/2000 | Akram |
| 6,089,920 A | 7/2000 | Farnworth et al. |
| 6,094,058 A | 7/2000 | Hembree et al. |
| 6,097,087 A | 8/2000 | Farnworth et al. |
| 6,103,547 A | 8/2000 | Corisis et al. |
| 6,107,122 A | 8/2000 | Wood et al. |
| 6,107,680 A | 8/2000 | Hodges |
| 6,117,382 A | 9/2000 | Thummel |
| 6,124,634 A | 9/2000 | Akram et al. |
| 6,150,717 A | 11/2000 | Wood et al. |
| 6,159,764 A | 12/2000 | Kinsman et al. |
| 6,172,419 B1 | 1/2001 | Kinsman |
| 6,184,465 B1 | 2/2001 | Corisis |
| 6,198,172 B1 | 3/2001 | King et al. |
| 6,203,319 B1 * | 3/2001 | Lee .............................. 249/54 |
| 6,208,519 B1 | 3/2001 | Jiang et al. |
| 6,210,992 B1 | 4/2001 | Tandy et al. |
| 6,215,175 B1 | 4/2001 | Kinsman |
| 6,228,548 B1 | 5/2001 | King et al. |
| 6,228,687 B1 | 5/2001 | Akram et al. |
| 6,229,202 B1 | 5/2001 | Corisis |
| 6,246,108 B1 | 6/2001 | Corisis et al. |
| 6,258,623 B1 | 7/2001 | Moden et al. |
| 6,258,624 B1 | 7/2001 | Corisis |
| 6,259,153 B1 | 7/2001 | Corisis |
| 6,277,671 B1 | 8/2001 | Tripard |
| 6,284,571 B1 | 9/2001 | Corisis et al. |
| 6,291,894 B1 | 9/2001 | Farnworth et al. |
| 6,294,839 B1 | 9/2001 | Mess et al. |
| 6,303,981 B1 | 10/2001 | Moden |
| 6,303,985 B1 | 10/2001 | Larson et al. |
| 6,310,390 B1 | 10/2001 | Moden |
| 6,314,639 B1 | 11/2001 | Corisis |
| 6,315,936 B1 * | 11/2001 | Black et al. ........... 264/272.13 |
| 6,316,285 B1 | 11/2001 | Jiang et al. |
| 6,326,242 B1 | 12/2001 | Brooks et al. |
| 6,326,244 B1 | 12/2001 | Brooks et al. |
| 6,326,687 B1 | 12/2001 | Corisis |
| 6,326,697 B1 | 12/2001 | Farnworth |
| 6,326,698 B1 | 12/2001 | Akram |
| 6,329,220 B1 | 12/2001 | Bolken et al. |
| 6,331,221 B1 | 12/2001 | Cobbley |
| 6,331,453 B1 | 12/2001 | Bolken et al. |
| 6,332,766 B1 | 12/2001 | Thummel |

* cited by examiner

METHOD FOR PACKAGING MICROELECTRONIC SUBSTRATES

TECHNICAL FIELD

This invention relates to methods and apparatuses for packaging microelectronic substrates.

BACKGROUND OF THE INVENTION

Packaged microelectronic devices, such as memory chips and microprocessor chips, typically include a microelectronic substrate die encased in an epoxy protective covering. The die includes functional features, such as memory cells, processor circuits, and interconnecting circuitry. The die also typically includes bond pads electrically coupled to the functional features. The bond pads are coupled to pins or other types of terminals that extend outside the protective covering for connecting to buses, circuits and/or other microelectronic devices.

In one conventional arrangement shown in FIG. 1, a mold or cull tool 40 simultaneously encases a plurality of microelectronic substrates 30. The cull tool 40 can include an upper plate 42 removably positioned on a lower plate 41 to define a plurality of substrate chambers 45, an upright pellet cylinder 60, and a plurality of channels 46 connecting the substrate chambers 45 to the cylinder 60. A narrow gate 44 is positioned between each channel 46 and a corresponding substrate chamber 45. A cylindrical pellet 20 formed from an epoxy mold compound is positioned in the cylinder 60, and a plunger 50 moves downwardly within the cylinder 60 to transfer heat and exert pressure against the pellet 20. The heat and pressure from the plunger liquifies the mold compound of the pellet 20. The liquified mold compound flows through the channels 46 and into the substrate chambers 45 to surround the microelectronic substrates 30 and drive out air within the cull tool 40 through vents 43.

The mold compound in the substrate chambers 45 forms a protective covering around each microelectronic substrate 30. The residual mold compound in the channels 46 and in lower portion of the cylinder 60 forms "cull." The cull has thin break points corresponding to the location of each gate 44. After the upper plate 42 is separated from the lower plate 41, the encapsulated microelectronic substrates 30 and the cull are removed from the tool 40 as a unit. The encapsulated microelectronic substrates 30 are then separated from the cull at the break points.

The mold compound that forms the pellet 20 is typically a high temperature, humidity-resistant, thermoset epoxy. One drawback with this compound is that it can be brittle and accordingly the corners of the pellet 20 can chip. One approach to addressing this drawback is to provide a shallow chamfer at the corners 21, as shown in FIG. 1. Another drawback with this compound is that it must be elevated to a relatively high temperature before it will flow through the cull tool 40. Accordingly, the cull tool 40 and the plunger 50 can be heated to improve the heat transfer to the pellet 20. Furthermore, the lower plate 41 of the cull tool 40 can include one or more protrusions 47 that can improve the flow of the mold compound within the cull tool 40.

Still another drawback with the molding process discussed above is that the cull cannot be easily recycled because it is formed from a thermoset material that does not "re-liquify" upon re-heating. Accordingly, the cull is waste material that must be discarded, which increases the materials cost of producing the packaged microelectronic devices. One approach to address this drawback is to reduce the volume of the pellet 20 and, correspondingly, the channels 46 that define the shape and volume of the cull. For example, one conventional approach includes reducing the length and/or the diameter of the pellet 20. However, such pellets are not compatible with existing handling machines. For example, if the pellet length is decreased substantially, the length and diameter of the pellet will be approximately equal. The sorting and handling machines (not shown) that orient the pellets 20 for axial insertion into the cylinder 60 cannot properly orient the shorter pellets because the machines cannot distinguish between the length and diameter of the pellet. Furthermore, the handling machines are typically calibrated to reject undersized pellets on the basis of pellet length and accordingly would likely reject all or none of the reduced-length pellets.

SUMMARY OF THE INVENTION

The present invention is directed toward methods and apparatuses for packaging microelectronic substrates. A method in accordance with one aspect of the invention includes forming a pellet of uncured thermoset mold compound to have a first end surface, a second end surface opposite the first end surface, and an intermediate surface between the first and second end surfaces. The method further includes forming at least one cavity in the pellet and at least partially enclosing the microelectronic substrates by pressurizing the pellet and flowing the pellet around the microelectronic substrate.

A method in accordance with another aspect of the invention includes forming a pellet suitable for use with a pellet-handling apparatus configured to handle cylindrical pellets having a selected length, a selected radius less than the selected length, and a selected volume approximately equal to pi times the selected length times the square of the selected radius. The method includes forming a pellet material into a pellet body having a first end surface, a second end surface opposite the first end surface, and an intermediate surface between the end surfaces. The pellet body has a maximum length approximately equal to the selected length, a maximum cross-sectional dimension approximately equal to twice the selected radius, and a volume less than the selected volume by at least about 5%.

The invention is also directed to a pellet for packaging at least one microelectronic substrate. The pellet can include a pellet body formed from an uncured thermoset mold material. The pellet body has a first end surface, a second end surface facing opposite the first end surface, and an intermediate surface between the first and second end surfaces. The first end surface, the second end surface and the intermediate surface define an internal volume, and at least one of the surfaces and/or the internal volume has at least one cavity. In one aspect of this invention, the cavity has a generally spherical shape. In another aspect of this invention, the cavity can include a slot in the first end surface arranged transverse to the side surface. In still another aspect of this invention, the pellet body can have a generally right-cylindrical shape with a chamfered corner forming angles approximately 45 degrees between the first end surface and the side surface.

The invention is also directed to an apparatus for packaging a microelectronic substrate. The apparatus can include a mold body having a chamber with a first portion configured to extend at least partially around the microelectronic substrate and a second portion coupled to the first portion. A plunger is positioned in the second portion of the chamber and is moveable within the second portion of the chamber in an axial direction. The plunger has a side wall aligned with the axial direction and an end wall transverse to the axial direction. At least a portion of the end wall extends axially away from the side wall. In one aspect of this embodiment, the plunger is configured for use with a pellet having a cylindrical side surface and two end surfaces. Each end surface can have a cavity defining a cavity shape, and the end wall of the plunger can be shaped to be received in the cavity of the pellet.

DETAILED DESCRIPTION

The present disclosure describes methods and apparatuses for encapsulating microelectronic substrates. Many specific details of certain embodiments of the invention are set forth in the following description and in FIGS. 2–8 to provide a thorough understanding of these embodiments. One skilled in the art, however, will understand that the present invention may have additional embodiments, or that the invention may be practiced without several of the details described below.

Figure 1:
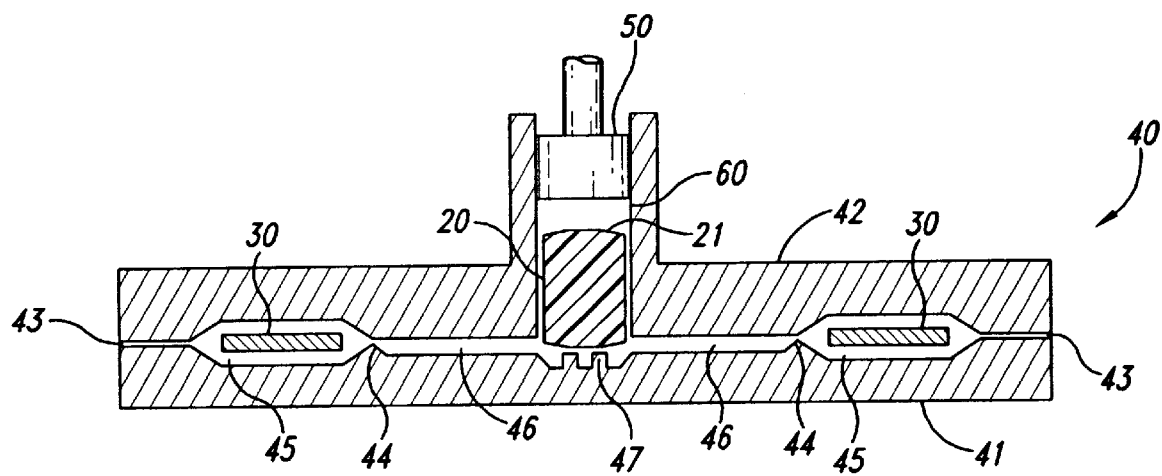
FIG. 1 is a partially schematic cross-sectional view of a molding apparatus for encapsulating microelectronic substrates in accordance with the prior art.
Figure 2:
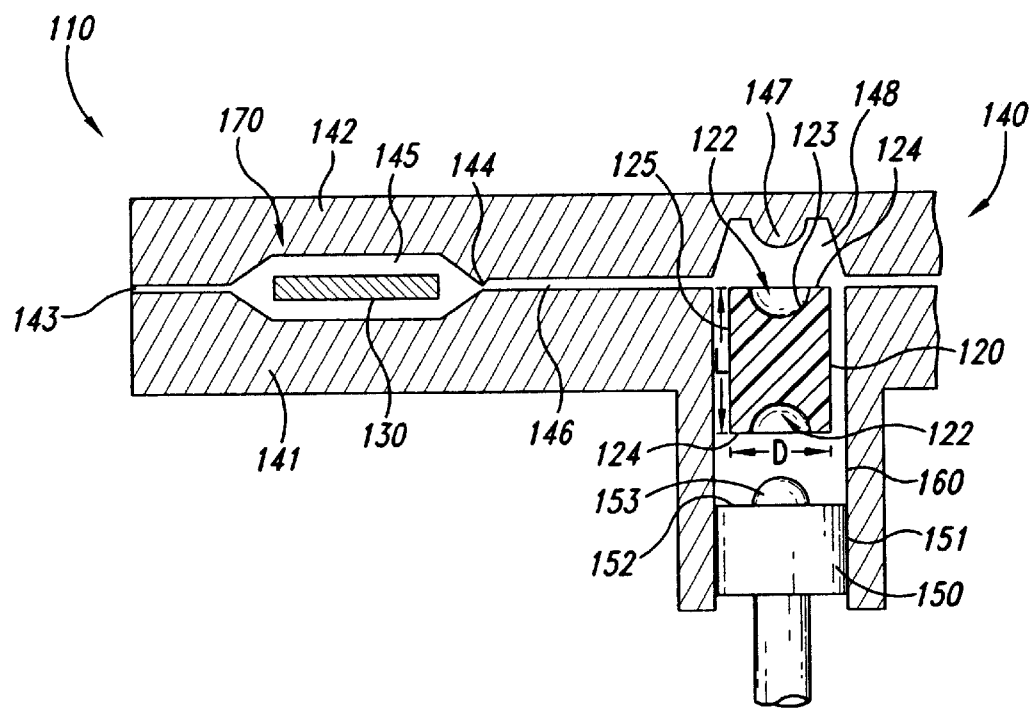
FIG. 2 is a partially schematic cross-sectional view of a molding apparatus and pellet for encapsulating microelectronic substrates in accordance with an embodiment of the invention.

FIG. 2 is a partially schematic cross-sectional view of a portion of an apparatus 110 for encapsulating a microelectronic substrate 130 in accordance with an embodiment of the invention. In one aspect of this embodiment, the apparatus 110 includes a mold or cull tool 140 configured to receive a pellet 120, with both the tool 140 and the pellet 120 configured to reduce the volume of waste pellet material when compared to conventional arrangements. In one aspect of the invention, the tool 140 includes an upper portion 142 positioned above a lower portion 141. The upper and lower portions 142 and 141 have recesses which, when aligned as shown in FIG. 2, form an internal chamber 170 for encapsulating the microelectronic substrate 130. The microelectronic substrate 130 can be a die, such as a DRAM die or a processor die, or alternatively, the microelectronic substrate 130 can include other electronic components.

The internal chamber 170 can include a substrate portion 145 that houses the microelectronic substrate 130, a cylinder portion 160 that houses the pellet 120, and a channel portion 146 connecting the cylinder portion 160 to the substrate portion 145. The chamber 170 can also include a vent 143 for exhausting air and/or other gases from the tool 140 as the pellet 120 fills the channel portion 146 and the substrate portion 145. For purposes of illustration, one channel portion 146 and one substrate portion 145 are shown in FIG. 2; however, the tool 140 can include additional channel portions 146 and substrate portions 145 radiating outwardly from the cylinder portion 160 so that a single pellet 120 can be used to encapsulate several (e.g., two-six, or even more) microelectronic substrates 130.

The portions of the internal chamber 170 that fill with waste pellet material (i.e., the pellet material that extends from the cylinder portion 160 to the substrate portion 145) define the cull volume as discussed above. These portions of the internal chamber 170 have a volume less than that of conventional chambers configured to encapsulate the same number and type of microelectronic substrates 130. For example, the channel portions 146 can be smaller than the channels of conventional molds. Furthermore, the upper portion 142 of the tool 140 can include a protrusion 147 aligned with a central portion 148 of the chamber 170. The protrusion 147 can further reduce the volume of the chamber 170.

The volume of the pellet 120 is also less than the volume of conventional pellets; however, the maximum external dimensions of the pellet 120 are approximately identical to those of conventional pellets configured to encapsulate the same number and type of microelectronic substrates 130. For example, the overall length L and diameter D of the pellet 120 are identical to or nearly identical to the length and diameter, respectively, of a conventional pellet used for the same application. Accordingly, the pellet 120 can be used with conventional pellet handling and sorting machines without changing the design, configuration or settings of the conventional machines. In one embodiment, the pellet 120 can have an overall diameter D of approximately 13 millimeters to 16 millimeters and an overall length L greater than the diameter D. For example, when the diameter D is about 13 millimeters, the length L can be about 17 millimeters. In other embodiments, the pellet 120 can have other dimensions so long as the length L exceeds the diameter D by an amount sufficient to allow the pellet 120 to be used with conventional pellet handling machines that properly orient the pellets 120 in the chamber 160 by distinguishing the length L from the diameter D.

In one embodiment, the volume of the pellet 120 is less than that of conventional pellets having the same maximum external length and diameter because the external surfaces of the pellet 120 include one or more cavities. For example, the pellet 120 can include a cylindrical side surface 125 positioned between two circular end surfaces 124, and each end surface 124 can include a cavity 122. In one aspect of this embodiment, the cavities 122 reduce the volume of the mold compound forming the pellet 120 by from about 5% to about 20% when compared to a conventional pellet with the same maximum external dimensions for the length and width. Conventional pellets have a volume of approximately $\pi R^2 L$, where R (radius)=½ D. Alternatively, the pellet 120 can have a greater than 20% volume reduction when compared to conventional pellets. In another aspect of this embodiment, the cavities 122 can be defined by a hemispherical or partially hemispherical cavity wall 123. Alternatively, the cavities 122 can have other shapes that reduce the volume of the pellet 120 without reducing the overall external dimensions of the pellet 120, as will be described in greater detail below with reference to FIGS. 3–8.

The pellet 120 can be formed from a mold compound that includes a high temperature, humidity resistant thermoset material, such as an epoxy resin. The epoxy resin can have a variety of suitable formulations and can include biphenyl compounds, di-cyclo pentadiene compounds, ortho-cresole novolak compounds and/or multifunctional compounds, all of which are available from Nitto Denko Co. of Fremont, Calif. In other embodiments, the pellet 120 can have other formulations suitable for encapsulating the microelectronic substrates 130.

In all the foregoing embodiments described with reference to FIG. 2, the pellet 120 is sized to fit within the cylinder 160 of the cull tool 140 and above a plunger 150. The plunger 150 is axially movable within the cylinder 160 between a first position (shown in FIG. 2) to receive the pellet 120 and a second position with the plunger 150 moved axially upwardly to compress the pellet 120. Accordingly, the plunger 150 can force the mold compound forming the pellet 120 into the channel portion 146 and the substrate portion 145 of the chamber 170.

In one aspect of this embodiment, the plunger 150, the walls of the cylinder 160, and/or the other surfaces of the cull tool 140 that define the chamber 170 are heated to liquefy the pellet 120. In still a further aspect of this embodiment, the plunger 150 can include a side wall 151 adjacent the walls of the cylinder 160, an end wall 152 transverse to the side wall 151 and a protrusion 153 that extends axially away from the end wall 152 and the corner between the end wall 152 and the side wall 151. The protrusion 153 can have a width less than or equal to the width of the end wall 152. In still a further aspect of this embodiment, the protrusion 153 is sized to fit within the cavity 122 at the end of the pellet 120. Accordingly, when the plunger 150 is heated, the protrusion 153 can increase the rate of heat transfer to the pellet 120 (relative to a conventional plunger having a flat end surface) because more surface area of the plunger 150 contacts the pellet 120. Similarly, when the upper portion 142 of the cull tool 140 is heated, the protrusion 147 can increase the heat transferred to the pellet 120 by engaging the walls 123 of cavity 122 at the opposite end of the pellet 120.

In operation, the microelectronic substrate 130 is positioned in the substrate portion 145 of the chamber 170 and the pellet 120 is positioned in the cylinder portion 160. The plunger 150 and/or the surfaces defining the chamber 170 are heated, and the plunger 150 is moved upwardly to compress and liquify the pellet 120. The plunger accordingly forces the liquified pellet 120 through the channel portion 146 and into the substrate portion 145 around the microelectronic substrate 130. The encapsulated microelectronic substrate 130 and the cull (which occupies the channel 146 and the central portion 148 of the chamber 170) are removed as a unit, and then the encapsulated microelectronic substrate 130 is separated from the cull, in a manner generally similar to that discussed above.

One feature of an embodiment of the apparatus 110 and the method described above with reference to FIG. 2 is that the pellet 120 has the same maximum length and width as a conventional pellet to be compatible with existing pellet handling machines, but the pellet 120 has a reduced volume. Accordingly, the culls formed from the pellet 120 have a lower volume than conventional culls to reduce the cost of the pellets and the waste material left over after encapsulating the microelectronic substrates 130 with the pellets.

Another feature of an embodiment of the apparatus 110 and method described above with reference to FIG. 2 is that the size of the cavities 122 can be selected to match the size of the internal chamber 170 and/or the size of the microelectronic substrate 130. For example, pellets 120 having relatively large cavities 122 can be used with cull tools 140 having relatively small internal volumes 170, and pellets 120 having relatively small cavities 122 (or no cavities) can be used with cull tools 140 having relatively large internal volumes 170. Similarly, pellets 120 having relatively large cavities 122 can be used to encapsulate relatively large microelectronic substrates 130 and pellets 120 having relatively small cavities 122 (or no cavities) can be used to encapsulate relatively small microelectronic substrates 130. Accordingly, pellets 120 having the same overall external dimensions can be used with different cull tools 140 to encapsulate different microelectronic substrates 130 without requiring different pellet handling equipment.

Figure 3:
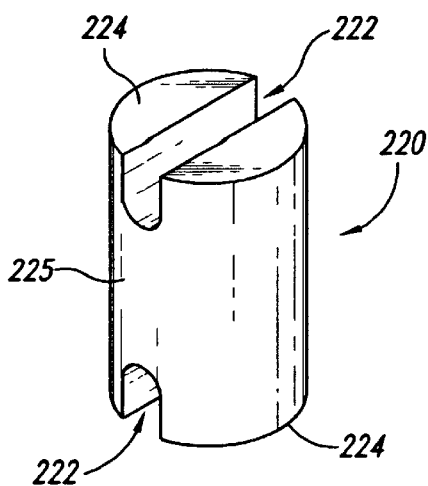
FIG. 3 is a top isometric view of a pellet having a slotted end surface for encapsulating a microelectronic substrate in accordance with another embodiment of the invention.

FIGS. 3–8 depict other pellets having the same overall external dimensions as conventional pellets (but reduced volumes) in accordance with alternate embodiments of the invention. For example, FIG. 3 is a top isometric view of a pellet 220 having a generally cylindrical side surface 225, circular end surfaces 224, and a slot 222 in each end surface 224. Each end surface 224 can include a single slot 222, or alternatively, each end surface 224 can include a plurality of slots 222. In either embodiment, the pellet 220 can be used in conjunction with an apparatus generally similar to the apparatus 110 shown in FIG. 2, but having tab-shaped protrusions that match the shape of the slots 222 instead of the hemispherical protrusions 147 and 153 shown in FIG. 2. Accordingly, the rate of heat transfer to the pellet 220 can be increased when compared to conventional devices in a manner generally similar to that described above with reference to FIG. 2.

Referring now to FIGS. 2 and 3, the pellet 220 can be compressed with a plunger 150 having a flat end wall 152 and a cull tool 140 having a flat central portion 148 opposite the end wall in an alternate embodiment. In this alternate embodiment, the volume of the cull can be reduced by an amount equal to the volume of the cavities 222 by reducing the volume of the channels 146 and/or other portions of the cull tool 140. Accordingly, the slots 222 in pellet 220 may have certain advantages over the spherical cavities 122 in the pellet 120 described above with reference to FIG. 2. For example, when the plunger 150 has a flat end wall 152, the slot 222 will not entrap air as the plunger 150 engages the pellet 220. Instead, air in the slot 222 will tend to flow laterally around the side surface 225 of the pellet 220 as the plunger 150 compresses the pellet 220.

Figure 4:
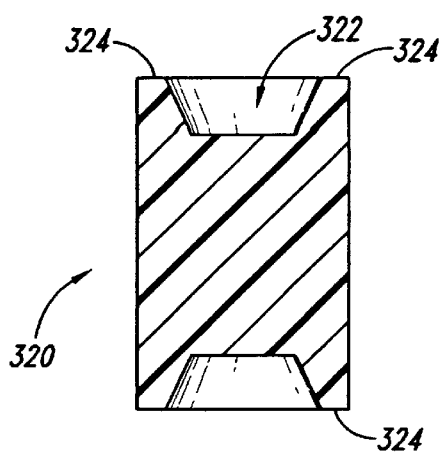
FIG. 4 is a side cross-sectional view of a pellet having an end surface with conical indentations in accordance with still another embodiment of the invention.
Figure 5:
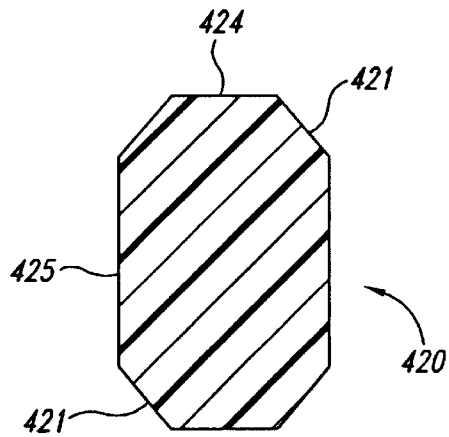
FIG. 5 is a side cross-sectional view of a pellet having beveled corners in accordance with another embodiment of the invention.

FIG. 4 is a side cross-sectional view of a pellet 320 having frustro-conical cavities 322 each end surface 324. FIG. 5 is a side cross-sectional view of a cylindrical pellet 420 having a side surface 425, end surfaces 424 and a chamfered or beveled corner 421 at the intersection between the side surface 425 and each end surface 424. In one aspect of this embodiment, the chamfered corner 421 can form an angle of approximately 45 degrees with the side surface 425 and each of the end surfaces 424. In alternate embodiments the chamfered corner 421 can form other angles with the side surface 425 and end surfaces 424, so long as the pellet 420 has a reduced volume of at least 5% (and between 5% and 20%, in one embodiment) when compared to a conventional pellet having the same maximum length and width.

Figure 6:
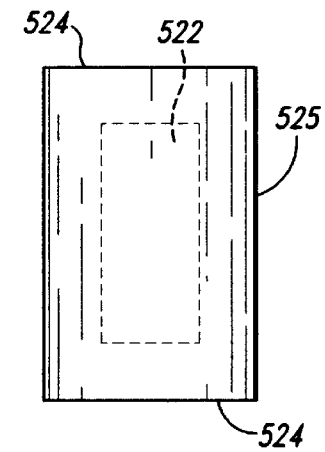
FIG. 6 is a side elevation view of a pellet having a hollow internal cavity in accordance with still another embodiment of the invention.

FIG. 6 is a side elevation view of a pellet 520 having a side surface 525 and end surfaces 524 that completely enclose an internal cavity 522. Alternatively, the side surface 525 and/or the end surfaces 524 can have one or more apertures that extend into the cavity 522 to provide a vent.

An advantage of this alternate arrangement is that the apertures can reduce the likelihood for entrapping air as the pellet 520 is compressed by the plunger 150 (FIG. 2).

Figure 7:
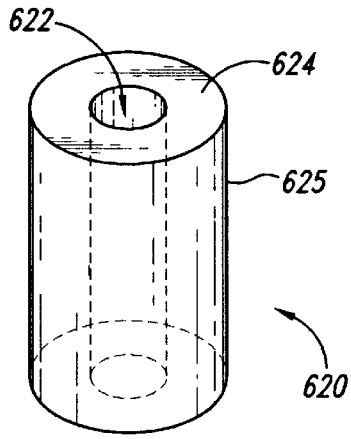
FIG. 7 is a top isometric view of a pellet having a cavity extending therethrough in accordance with yet another embodiment of the invention.
Figure 8:
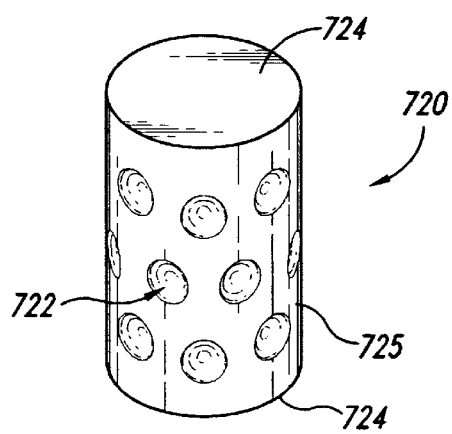
FIG. 8 is a top isometric view of a pellet having a side surface with a plurality of cavities in accordance with still another embodiment of the invention.

FIG. 7 is a top isometric view of a pellet 620 having a side surface 625, opposite-facing end surfaces 624, and a cavity 622 extending entirely through the pellet 620 from one end surface 624 to the other. FIG. 8 is a top isometric view of a pellet 720 having round end surfaces 724 and a cylindrical side surface 725 with a plurality of cavities 722. In one aspect of this embodiment, the cavities 722 extend part-way into the side surface 725. Alternatively, the cavities 722 can extend entirely through the side surface 725.

In each of the foregoing embodiments discussed above with reference to FIGS. 2–8, the pellets have the same overall external dimensions as conventional pellets, but are formed from a volume of mold compound that is less than the volume used for conventional pellets having the same maximum length and width. In one aspect of these foregoing embodiments, the volume is at least 5% less than the volume of the conventional pellets. In another aspect of these foregoing embodiments, the density of the mold compound used to form the pellets is approximately the same as the mold compound density of the corresponding conventional pellets. Alternatively, the mold compound density can be increased or decreased. In any of the foregoing embodiments, the volume occupied by the cull is reduced by an amount approximately equal to the volume of the cavity or other volume-reducing feature of the pellet, for example by providing protrusions in the plunger 150 and/or the upper plate 142 and/or by reducing the volume of the channels 146 extending between the cylinder 160 and the substrate portion 145. Accordingly, reducing the volume of the pellet will not result in the mold material failing to fill the substrate portion 145 of the cavity 170, which could result in incomplete encapsulation of the microelectronic substrate 130.

From the foregoing it will be appreciated that, although specific embodiments of the invention have been described herein for purposes of illustration, various modifications may be made without deviating from the spirit and scope of the invention. For example, the cavities and other volume-reducing features described individually with respect to a particular embodiment can be combined in other embodiments. Accordingly, the invention is not limited except as by the appended claims.

What is claimed is:

1. A method for packaging a microelectronic substrate, comprising:
    forming a pellet of uncured thermoset mold compound to have a first end surface, a second end surface facing opposite the first end surface, and an intermediate surface between the first and second end surfaces;
    forming at least one cavity in the pellet; and
    at least partially enclosing the microelectronic substrate by pressurizing the pellet and flowing the pellet around the microelectronic substrate.

2. The method of claim 1 wherein forming a cavity in the pellet includes forming a first slot in the first end surface and a second slot in the second end surface, further comprising:
    disposing the pellet in a chamber having a transverse dimension greater than a transverse dimension of the first end surface;
    engaging a plunger with the first end surface of the pellet;
    collapsing the first and second slots without trapping air in the slots by driving the plunger against the pellet and forcing air from the slots transversely into the chamber; and
    exhausting the air from the chamber through a vent.

3. The method of claim 1 wherein the cavity is a first cavity formed in the first end surface of the pellet, further comprising forming a second cavity in the second end surface of the pellet.

4. The method of claim 1, further comprising forming the cavity to extend entirely through the pellet.

5. The method of claim 1, further comprising forming the pellet to have a cross-sectional dimension of between about 13 millimeters and about 16 millimeters and a length transverse to the cross-sectional dimension that exceeds the cross-sectional dimension.

6. The method of claim 1 wherein the microelectronic substrate is a first microelectronic substrate, further comprising at least partially enclosing a second microelectronic substrate with the pellet.

7. The method of claim 1, further comprising selecting the mold material to include an epoxy.

8. The method of claim 1, further comprising forming the cavity to have a generally hemispherical shape.

9. The method of claim 1, further comprising forming the cavity to have a generally cylindrical shape.

10. The method of claim 1, further comprising forming the cavity to include a slot in the first end surface arranged transverse to the side surface.

11. The method of claim 1, further comprising forming the pellet to have a length transverse to the first and second end surfaces that exceeds a widthwise dimension of the first and second surfaces.

12. The method of claim 1, further comprising selecting the mold material to include biphenyl, di-cyclo pentadiene, ortho-cresole novolak and/or a multifunctional material.

13. The method of claim 1, further comprising selecting the microelectronic substrate to include a DRAM device.

14. The method of claim 1, further comprising curing the mold material by elevating a temperature of the mold material after disposing the pellet around the microelectronic substrate.

* * * * *

UNITED STATES PATENT AND TRADEMARK OFFICE
CERTIFICATE OF CORRECTION

PATENT NO. : 6,558,600 B1
DATED : May 6, 2003
INVENTOR(S) : Williams et al.

It is certified that error appears in the above-identified patent and that said Letters Patent is hereby corrected as shown below:

Column 1,
Line 40, add -- the -- between "in" and "lower";
Line 41, add -- a -- between "forms" and "cull";

Column 2,
Line 59, add -- of -- between "angles" and "approximately";

Signed and Sealed this

Eighteenth Day of November, 2003

JAMES E. ROGAN
*Director of the United States Patent and Trademark Office*